(12) United States Patent
Greaux

(10) Patent No.: US 11,800,836 B2
(45) Date of Patent: Oct. 31, 2023

(54) DEVICE FOR BAGGING FRUIT AND VEGETABLE ON TREE

(71) Applicant: Patrick Greaux, Southwest Ranches, FL (US)

(72) Inventor: Patrick Greaux, Southwest Ranches, FL (US)

( * ) Notice: Subject to any disclaimer, the term of this patent is extended or adjusted under 35 U.S.C. 154(b) by 0 days.

(21) Appl. No.: 17/964,497

(22) Filed: Oct. 12, 2022

(65) Prior Publication Data
US 2023/0139583 A1 May 4, 2023

Related U.S. Application Data

(60) Provisional application No. 63/272,801, filed on Oct. 28, 2021.

(51) Int. Cl.
*A01G 13/02* (2006.01)

(52) U.S. Cl.
CPC ....... *A01G 13/0237* (2013.01); *A01G 13/025* (2013.01)

(58) Field of Classification Search
CPC .......................... A01G 13/0237; A01G 13/025
See application file for complete search history.

(56) References Cited

U.S. PATENT DOCUMENTS

| | | | | |
|---|---|---|---|---|
| 1,955,950 A * | 4/1934 | Copeman | ........... | A01G 13/0237 118/DIG. 8 |
| 5,083,418 A * | 1/1992 | Reece | ................. | A01D 46/247 56/339 |
| 5,406,746 A * | 4/1995 | Hoshino | ............. | A01G 13/0237 47/24.1 |
| 5,535,543 A * | 7/1996 | Alexander | ......... | A01G 13/0237 383/102 |
| 5,857,316 A * | 1/1999 | Murdock | ............. | A01D 46/247 56/339 |
| 6,298,645 B1 * | 10/2001 | Hai | ...................... | A01D 46/247 56/332 |
| 7,500,343 B2 * | 3/2009 | Hsia | ...................... | A01D 46/253 56/332 |
| D809,352 S * | 2/2018 | Tia | ................................... | D8/1 |
| 11,464,175 B1 * | 10/2022 | Clarke | ............... | A01G 13/0237 |
| 2004/0128906 A1 * | 7/2004 | Jiang | .................. | A01G 13/0237 47/24.1 |
| 2010/0170818 A1 * | 7/2010 | Lin | .................... | A01G 13/0237 383/72 |

(Continued)

FOREIGN PATENT DOCUMENTS

| | | | | |
|---|---|---|---|---|
| FR | 2159268 A1 * | 6/1973 | | |
| GB | 2071975 A * | 9/1981 | ......... | A01G 13/0237 |

*Primary Examiner* — Jessica B Wong
(74) *Attorney, Agent, or Firm* — Barry Choobin; Patent 360

(57) ABSTRACT

A device and a method for bagging a fruit or a vegetable on a tree, the device includes two arms of a hoop shape profile to which are provided spaced apart fasteners on inner surfaces thereof. A bag at its opening periphery can be releasably mounted to the two arms through the fasteners. The bag has a drawstring with a lock, wherein the lock is immobilized in a cutout provided in the device and a leading end of the drawstring passing through the lock can extend further. A loop of the leading end of the drawstring is hooked to a hook that is coupled to a cord. The cord can be pulled to tighten the drawstring and thus the opening of the bag.

15 Claims, 6 Drawing Sheets

(56) References Cited

U.S. PATENT DOCUMENTS

| | | | |
|---|---|---|---|
| 2010/0172601 A1* | 7/2010 | Lin .................... | A01G 13/0237 383/41 |
| 2016/0157441 A1* | 6/2016 | Esler .................. | A01G 13/0237 43/124 |
| 2023/0139583 A1* | 5/2023 | Greaux ................ | A01G 13/025 47/32.2 |

* cited by examiner

DEVICE FOR BAGGING FRUIT AND VEGETABLE ON TREE

CROSS-REFERENCE TO RELATED APPLICATIONS

This application claims priority from a U.S. Provisional Patent Appl. No. 63/272,801 filed on Oct. 28, 2021, which is incorporated herein by reference in its entirety.

FIELD OF INVENTION

The present invention relates to a device for bagging fruit and vegetable on a tree, and more particularly, the present invention relates to a device for bagging hard-to-reach fruit and vegetable on a tree.

BACKGROUND

Harvesting healthy and ripened fruits and vegetables is always desired by gardeners, farmers, and the like people. However, the fruits on trees are often targeted by birds, insects, pests, microbes, and the like. Damage to the fruits leads to financial losses for the grower of the fruits. To safeguard the fruits from insects and the like, the growers spray pesticides on the fruits.

However, the use of chemicals is not desired by many. Bagging the fruits is an alternative to the use of chemicals on fruits to protect the fruits from pests, insects, birds, and the like. Many farmers and gardeners have started growing fruits in bags. Several types of bags are available including plastic bags, cellophane bags, and organza bags. The bags have proved to be useful, however, placing the bags around the fruits is quite laborious. Especially the hard-to-reach fruits on the tree may pose certain challenges for bagging such fruits. People use ladders to reach the height of the fruit on a tree to place the bag around the fruit. However, this can be risky because the person may fall from the ladder and get injured.

A need is therefore appreciated for a device that allows bagging the fruits safely from the ground and in particular bagging the hard-to-reach fruits on a tree.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a device for bagging fruits and vegetables on trees from the ground.

It is another object of the present invention that the device can be used to bag hard-to-reach fruits.

It is still another object of the present invention that the user does not have to climb a ladder.

It is a further object of the present invention that the device can be used with distinct types of bags.

It is yet another object of the present invention that the bags can be applied quickly and easily.

In one aspect, disclosed is a device for bagging a fruit or a vegetable on a tree, the device comprises a body that has a proximal end and a distal end; two arms extend from the proximal end of the body, the two arms first curve outwards and then inwards to form a hoop, wherein the two arms face each other, ends of the two arms are spaced apart from each other by a pre-determined distance; a plurality of fasteners disposed on inner surfaces of the two arms; and a cut out at the proximal end of the body, wherein the cut out is configured to receive a lock of a drawstring, wherein the cut out is shaped to limit movement of the lock. The plurality of fasteners are hook and loop fasteners. The plurality of fasteners are adhesive strips. The device further comprises a furrow that extends from the cut out towards the distal end, wherein a leading end of the drawstring passing through the lock can pass through the furrow towards the distal end. The device further comprises a guide, the guide comprises a pair of L shape flanges that point towards each other, wherein ends of the pair of L-shape flanges are spaced apart from each other. The device further comprises a groove at a bottom of the body, the groove configured to receive and fix to an end of a pole. The device further comprises a hook, the hook configured to releasably couple to the leading end of the drawstring, wherein the hook is further coupled to a cord, wherein the hook is of a round shape and has a substantially V-shape throat.

In one aspect, disclosed is an apparatus for bagging a fruit or a vegetable on a tree, the apparatus comprises a bag, the bag has a drawstring; and a device comprising: a body that has a proximal end and a distal end; two arms extend from the proximal end of the body, the two arms first curve outwards and then inwards to form a hoop, wherein the two arms face each other, ends of the two arms are spaced apart from each other by a pre-determined distance; a plurality of fasteners disposed on inner surfaces of the two arms; and a cut out at the proximal end of the body, wherein the cut out is configured to receive a lock of a drawstring, wherein the cut out is shaped to limit movement of the lock.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
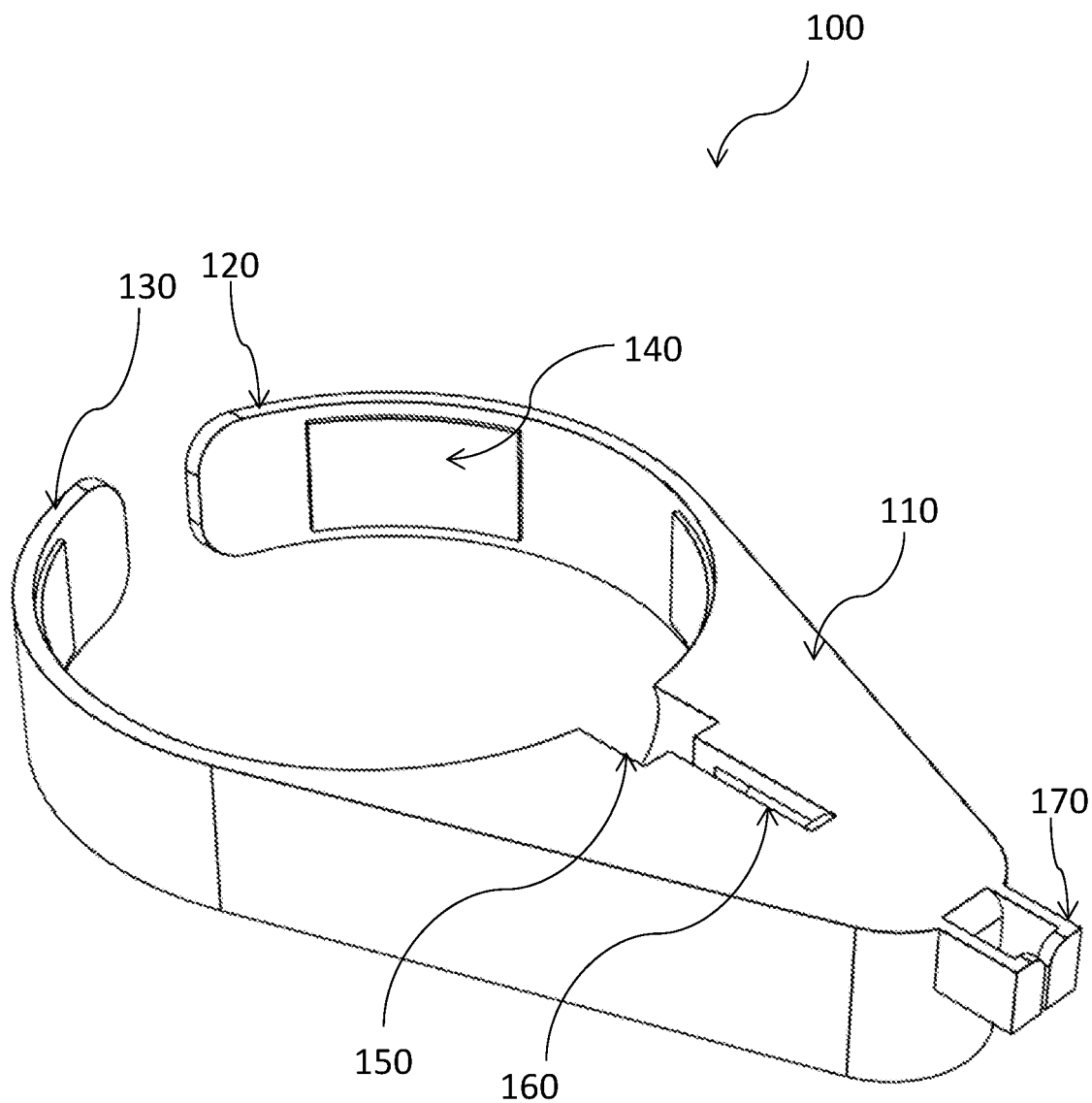
FIG. 1 is a perspective view of the device, according to an exemplary embodiment of the present invention.
Figure 2:
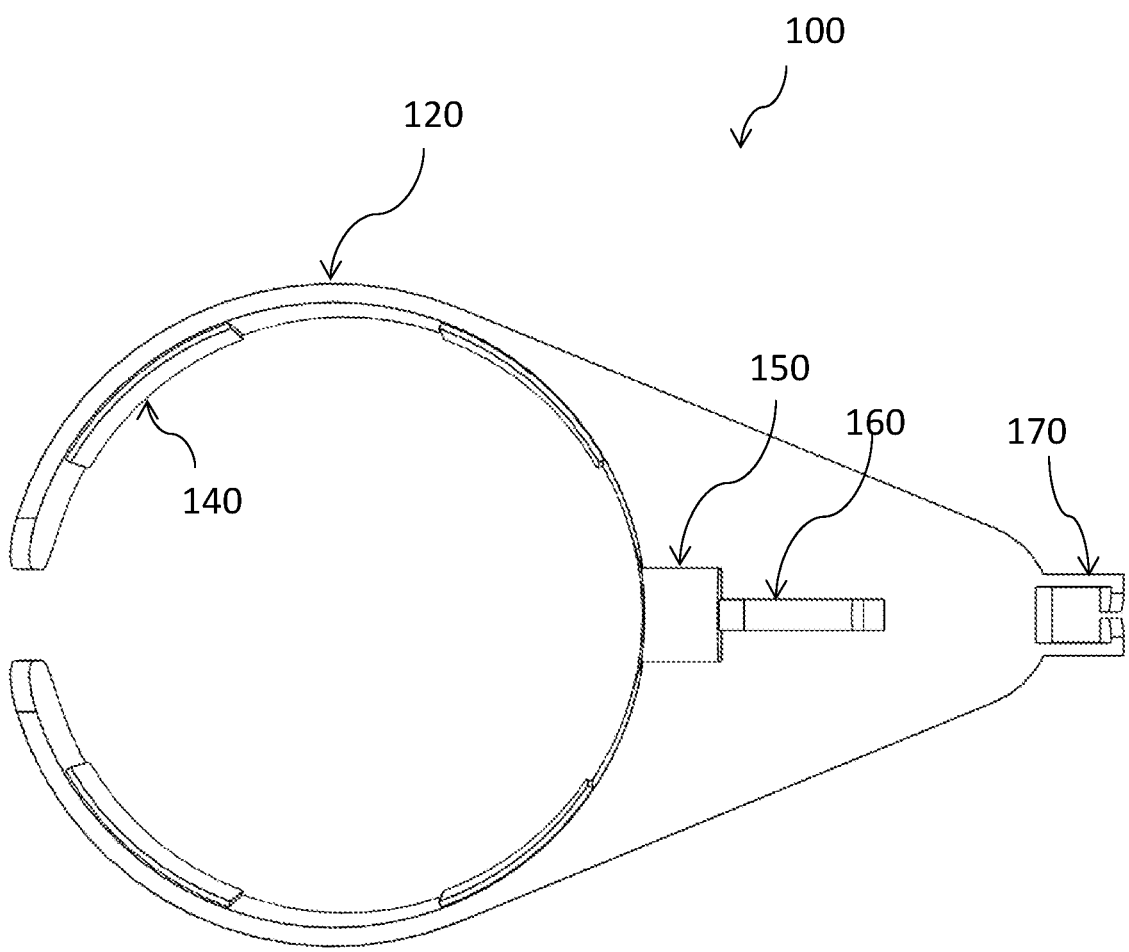
FIG. 2 is a front view of the device, according to an exemplary embodiment of the present invention.
Figure 3:
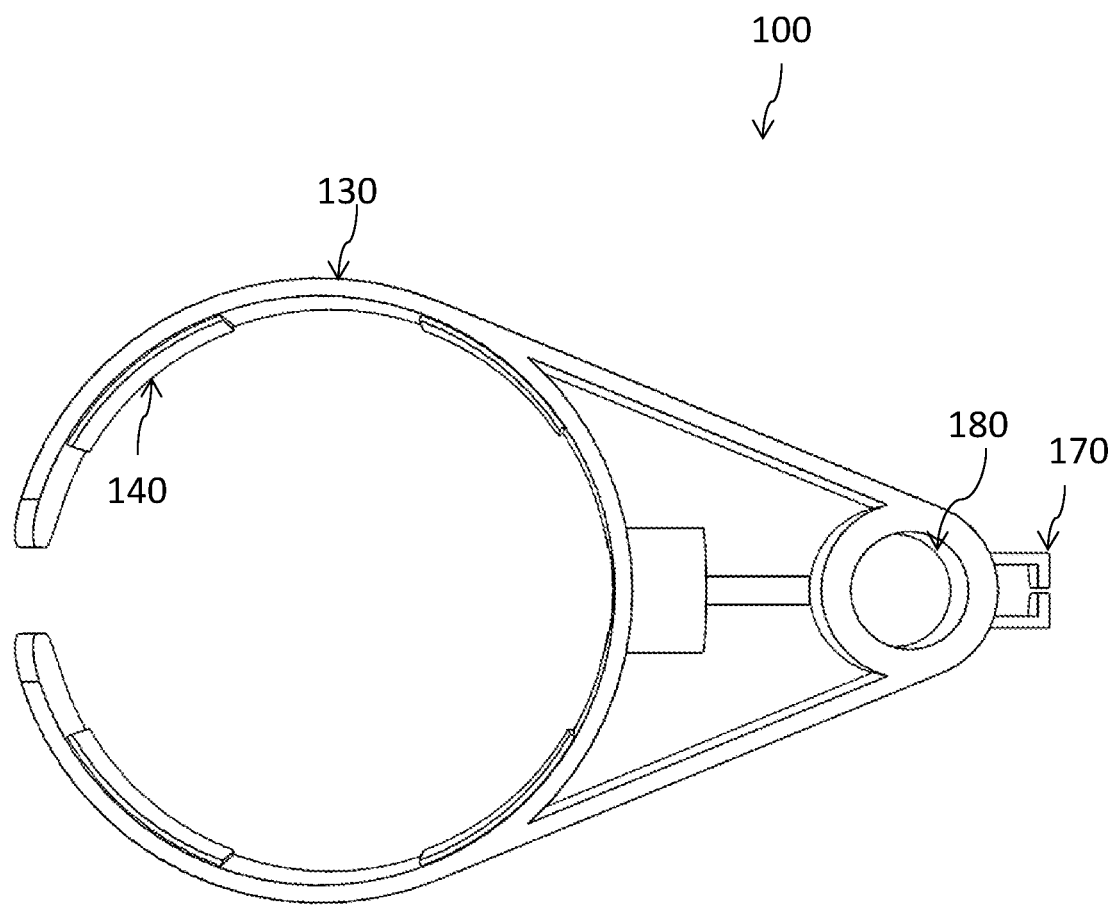
FIG. 3 is a bottom view of the device, according to an exemplary embodiment of the present invention.
Figure 4:
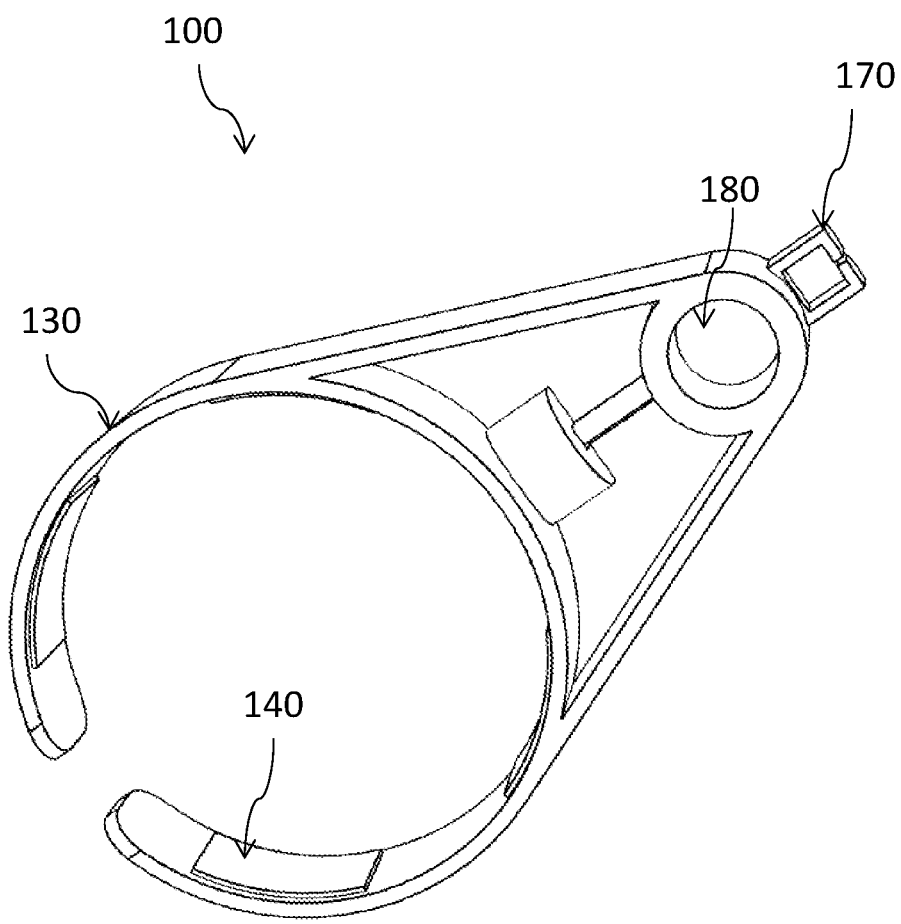
FIG. 4 is a bottom perspective of the device, according to an exemplary embodiment of the present invention.
Figure 5:
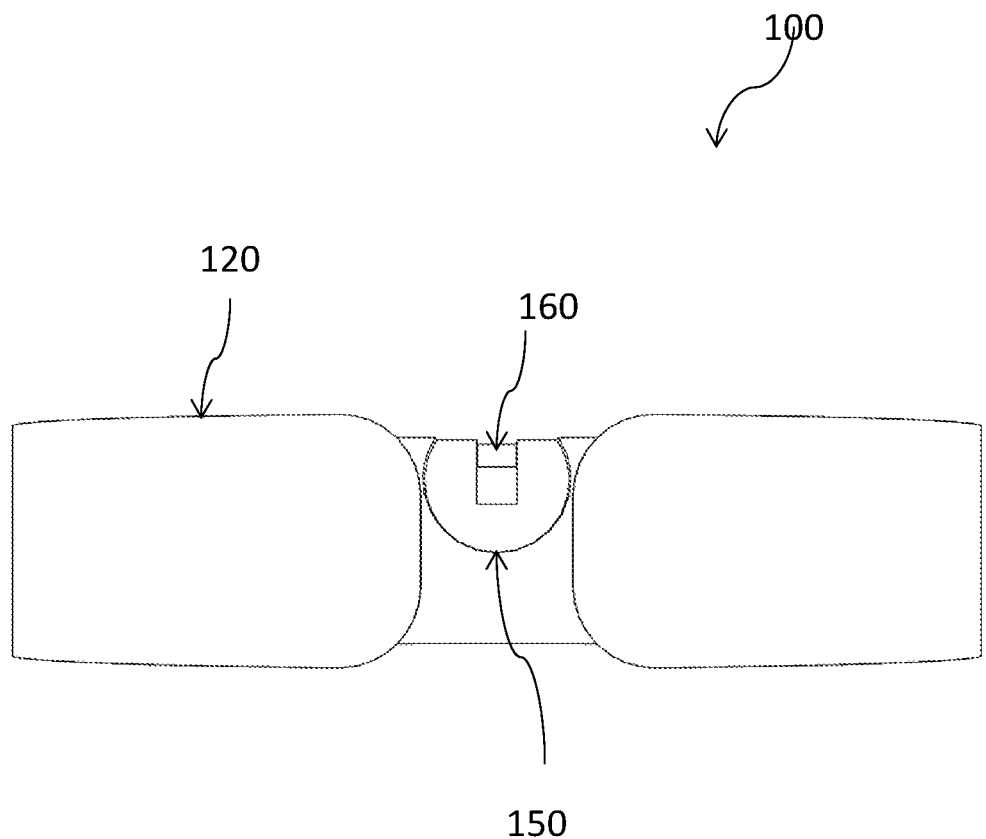
FIG. 5 is a front view of the device, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form to facilitate describing the subject innovation. Moreover, the drawings may not be to scale.

Disclosed is a device for bagging fruit and vegetable on a tree. Using the disclosed device, a person while standing on the ground can bag the fruits on tall trees. Moreover, hard-to-reach fruits on the tree can be easily reached by the disclosed device. The disclosed device is easy to use and may not require the person to ascend to a height, such as on a ladder. The disclosed device can be used to bag several fruits quickly.

Referring to FIGS. 1-5 which show different views of the disclosed device 100 that can be used for bagging fruit on a tree. The device includes a body 110 that has a proximal end and a distal end. Two arms 120 and 130 can extend from the proximal end of the body 110. Each of the two arms first curves outwards and then inwards to form a hoop-like profile. The two arms can face each other and extend in the same plane. The free ends of the two arms can be spaced apart. The free ends of the two arms can be separated by at least a predefined distance. The two arms can be wide and flat, wherein the inner surfaces of the two arms face each other. On the inner surfaces of the two arms can be provided a number of strips 140. The strips can be fasteners to which the bag can releasably couple. The two arms can hold the bag temporarily while the mouth of the bag remains open.

The strips can have a hook and loop fastener to which the bag can releasably hook. Alternatively, the strips can have a releasable adhesive to which the bag can releasably adhere. The two arms and the body can be rigid enough to hold the bag. For use, the peripheral portion of the bag along the opening of the bag can be coupled to the strips so that the mouth of the bag remains open, and the bag can be retained by the two arms. In one case, the bags can be made of nylon mesh or stainless steel that can couple to the strips. However, the bag of any other material is within the scope of the present invention.

The body 110 can have a cutout 150 at the proximal end thereof wherein the cutout can be of a step profile. As shown in the drawings, the cutout has a base and three side walls, wherein the cutout is open in the front facing the two arms. The cutout can receive a lock of a tie cord/drawstring such that to limit the movement and rotation of the lock. The cutout can be dimensioned to keep the lock immobile.

A furrow 160 in the body extends from the cutout towards the distal end of the body. The distal end of the body can have a guide 170. The guide includes a pair of L shape flanges that points toward each other to form a substantially rectangular, square, or circular shape. There is a small space between the ends of the two flanges.

On the bottom side of the body can be a groove 180 into which an elongated pole can be received and fixed. A device can be mounted to an end of a long pole. Depending on the height of the tree or fruits on the tree, a pole of sufficient length can be selected. The device can be interchangeably mounted to a pole. Moreover, telescoping poles are within the scope of the present invention. The end of the pole can frictionally fit into the groove 180. Alternatively, the groove can be threaded, and the end of the pole can have corresponding threads such that the device can be screwed onto the pole. Any other mechanism for coupling the disclosed device to the end of the pole is within the scope of the present invention.

In one implementation, disclosed is a method for bagging fruits and vegetables on the trees using the disclosed device. The bag can have a drawstring along its opening periphery such that the drawstring can be pulled to tighten the bag opening around a branch of a tree. The drawstring can pass through a sleeve provided along the periphery of the bag. Alternatively, the bag can have spaced-apart loops through which the drawstring can pass through. The drawstring can have a lock to fix the drawstring once pulled to the desired extent. In one implementation, the drawstring can be similar to a tie cord with a lock. The bag can be mounted to the strips of the two arms. The leading end of the drawstring can pass through the lock, and the lock can fit into the cutout. The leading end of the drawstring can then be taken along the furrow and passed through the guide. The drawstring can easily be inserted into the guide through the space between the two flanges. This small gap in the square guide allows the user to quickly slip the drawstring inside of the guide without having to feed it through. The leading end of the drawstring can then be coupled to a hook which in turn is attached to a long cord. The user can pull the long cord resulting in the pulling of the drawstring and thus closing of the bag. The leading end of the drawstring can be made into a knot and the hook can be freely inserted into the knot.

Figure 6:
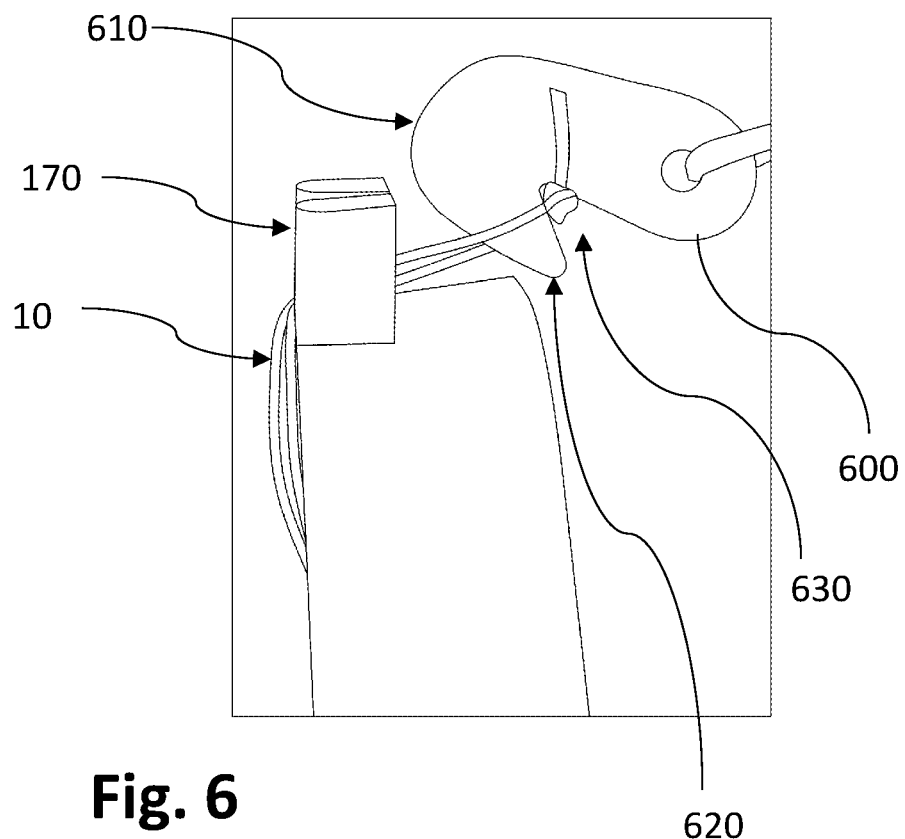
FIG. 6 shows a hook, according to an exemplary embodiment of the present invention.

FIG. 6 shows an exemplary embodiment of the hook 600 wherein the shape of the hook allows the hook to disengage when the drawstring 10 could no longer be pulled upon closing the bag. The hook 600 has a round head 610, a tooth 620, and a V-shape throat 630. When the cord hangs free and the device is moved away from the fruit, the round head of the hook comes in contact with the bottom of the device. At this point, the angle between the drawstring and the hook (perpendicular to each other) is such that to allow the tooth 620 of the hook to disengage from the knot of the drawstring. The round head and V-shape throat allows the device to disengage the hook from the leading knot of the drawstring. A user, after attaching the bag to the device, can lift the device using the pole to a position below the fruit on a tree. The fruit can be received into the bag passing through the two arms. Once, the fruit is within the bag and the arms of the device are around the branch of the tree, the long cord can be pulled to tighten the drawstring around the branch. Once the bag is secured to the branch, the hook can be separated from the drawstring and the device can be moved backward so that the branch can leave through the space between the two arms. Thereafter, the device can be lowered and prepared for the next bagging.

Figure 7:
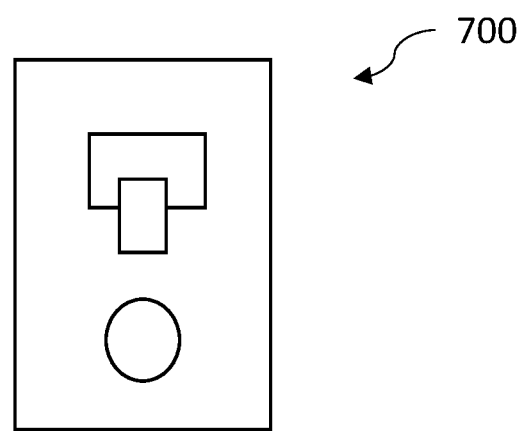
FIG. 7 shows a zip tie puller, according to an exemplary embodiment of the present invention.

FIG. 7 shows a zip tie puller 700 that can be used when zip ties are used instead of drawstrings. The leading end of the zip tie can be inserted into the zip tie puller and can be frictionally retained provided some downward tension is maintained on the zip tie puller. After bagging the fruit and letting go of the cord, the lack of tension on the cord and zip tie puller allows the zip tie to slip out of the zip tie puller while the device is being moved away from the fruit. The zip tie puller 700 is flat and can be made from materials such as aluminum. zip tie puller 700.

The disclosed device can be manufactured integrally as a single unit using a suitable process, such as molding. The device can be made from plastic that may be light in weight and economical, such as rigid polypropylene can be used. Other examples of plastics include polystyrene, polyethylene, polycarbonate, acrylics, and the like. Metals, such as Aluminum can also be used, and any such material is within the scope of the present invention.

The disclosed device can be adapted to varied sizes of fruits by increasing or decreasing the distance between the two opposite arms. For larger variations in size, the disclosed device can be manufactured in a range of sizes. In one implementation, a screw threadedly passing through one arm against the second arm can be used to increase and decrease the distance between two arms. Any other mechanism to increase and decrease the distance between two arms can be incorporated without departing from the scope of the present invention. Bags of varied sizes can be used with the disclosed device. The two arms form a hoop that can accommodate bags of a range of sizes. In one implementation, the bags can be made from Nylon mesh and stainlessless mesh.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A device for bagging a fruit or a vegetable on a tree, the device comprises:
    a body that has a proximal end and a distal end;
    two arms extend from the proximal end of the body, the two arms first curve outwards and then inwards to form a hoop, wherein the two arms face each other, ends of the two arms are spaced apart from each other by a pre-determined distance;
    a plurality of fasteners disposed on inner surfaces of the two arms configured to attach to and hold open a fruit or vegetable bag; and
    a cut out at the proximal end of the body, wherein the cut out is configured to receive a lock of a drawstring of the fruit or vegetable bag, wherein the cut out is shaped to limit movement of the lock.

2. The device according to claim 1, wherein the plurality of fasteners are hook and loop fasteners.

3. The device according to claim 1, wherein the plurality of fasteners are adhesive strips.

4. The device according to claim 1, wherein the device further comprises:
    a furrow that extends from the cut out towards the distal end, wherein a leading end of the drawstring passing through the lock can pass through the furrow towards the distal end.

5. The device according to claim 4, wherein the device further comprises:
    a guide, the guide comprises a pair of L shape flanges that point towards each other, wherein ends of the pair of L-shape flanges are spaced apart from each other.

6. The device according to claim 1, wherein the device further comprises:
    a groove at a bottom of the body, the groove configured to receive and fix to an end of a pole.

7. The device according to claim 5, wherein the device further comprises:
    a hook, the hook configured to releasably couple to the leading end of the drawstring, wherein the hook is further coupled to a cord, wherein the hook is of a round shape and has a substantially V-shape throat.

8. An apparatus for bagging a fruit or a vegetable on a tree, the apparatus comprises:
    a bag, the bag has a drawstring; and
    a device comprising:
        a body that has a proximal end and a distal end;
        two arms extend from the proximal end of the body, the two arms first curve outwards and then inwards to form a hoop, wherein the two arms face each other, ends of the two arms are spaced apart from each other by a pre-determined distance;
        a plurality of fasteners disposed on inner surfaces of the two arms configured to attach to and hold open the bag; and
        a cut out at the proximal end of the body, wherein the cut out is configured to receive a lock of the drawstring, wherein the cut out is shaped to limit movement of the lock.

9. A method for bagging a fruit or a vegetable on a tree, the method comprises:
    providing a device comprising:
        a body that has a proximal end and a distal end,
        two arms extend from the proximal end of the body, the two arms first curve outwards and then inwards to form a hoop, wherein the two arms face each other, ends of the two arms are spaced apart from each other by a pre-determined distance,
        a plurality of fasteners disposed on inner surfaces of the two arms configured to attach to and hold open a fruit or vegetable bag; and
        a cut out at the proximal end of the body, wherein the cut out is configured to receive a lock of a drawstring of the fruit or vegetable bag, wherein the cut out is shaped to limit movement of the lock.

10. The method according to claim 9, wherein the plurality of fasteners are hook and loop fasteners.

11. The method according to claim 9, wherein the plurality of fasteners are adhesive strips.

12. The method according to claim 9, wherein the device further comprises:
   a furrow that extends from the cut out towards the distal end, wherein a leading end of the drawstring passing through the lock can pass through the furrow towards the distal end.

13. The method according to claim 12, wherein the device further comprises:
   a guide, the guide comprises a pair of L shape flanges that point towards each other, wherein ends of the pair of L-shape flanges are spaced apart from each other.

14. The method according to claim 9, wherein the device further comprises:
   a groove at a bottom of the body, the groove configured to receive and fix to an end of a pole.

15. The method according to claim 13, wherein the device further comprises:
   a hook, the hook configured to releasably couple to the leading end of the drawstring, wherein the hook is further coupled to a cord, wherein the hook is of a round shape and has a substantially V-shape throat.

\* \* \* \* \*